United States Patent [19]

Hatwar

[11] Patent Number: 4,719,154
[45] Date of Patent: Jan. 12, 1988

[54] MAGNETO-OPTIC RECORDING ELEMENT WITH AMORPHOUS ALUMINUM-NITROGEN ALLOY LAYER

[75] Inventor: Tukaram K. Hatwar, Rochester, N.Y.

[73] Assignee: Eastman Kodak Company, Rochester, N.Y.

[21] Appl. No.: 908,365

[22] Filed: Sep. 17, 1986

[51] Int. Cl.$^4$ .............................................. G11B 7/24
[52] U.S. Cl. ................................. 428/694; 428/698; 428/704; 428/900; 430/945
[58] Field of Search ............... 428/694, 698, 900, 704; 365/122; 360/131, 135; 369/13, 288; 430/945

[56] References Cited

U.S. PATENT DOCUMENTS 4,610,912 9/1986 Takahashi et al. .................. 428/213
4,631,617 12/1986 Tanaka et al. ...................... 360/131

FOREIGN PATENT DOCUMENTS 139474 5/1985 European Pat. Off. .
152269 8/1985 European Pat. Off. .
145525 9/1985 Japan .

OTHER PUBLICATIONS

Japanese Journal of Applied Electronics-K. Ohta et al.-"Study on High Reliability of a Magnetooptic Medium with a Multilayer Structure", vol. 8 (1984) No. 2, pp. 93-96.
IEEE (1985) Intermag. Conference-K. Nakamura et al-"Enhancement of Kerr Rotation with Amorphous Si Film".
IEEE Transaction on Magnetics-T. Chen et al-"An Investigation of Amorphous Th-Fe Films for Magneto-Optic Memory Application"-vol. Mag-16, No. 5, Sep. 1980, pp. 1195-1196.

Primary Examiner—George F. Lesmes
Assistant Examiner—William M. Atkinson
Attorney, Agent, or Firm—Warren W. Kurz

[57] ABSTRACT

Disclosed herein is a novel magneto-optical recording element comprising an alloy thin film of aluminum and nitrogen, such film being contiguous with a magneto-optic recording layer. The $Al_{1-x}-N_x$ alloy is distinct from the stoichiometric AlN compound used in prior art in that it is substantially amorphous in character. The amorphous character of this alloy film gives rise to a substantially enhanced (8×) magneto-optic effect, as well as excellent corrosion resistance. Also disclosed is a reactive sputtering method for producing such amorphous aluminum-nitrogen alloy films.

6 Claims, 8 Drawing Figures

FIG. 4
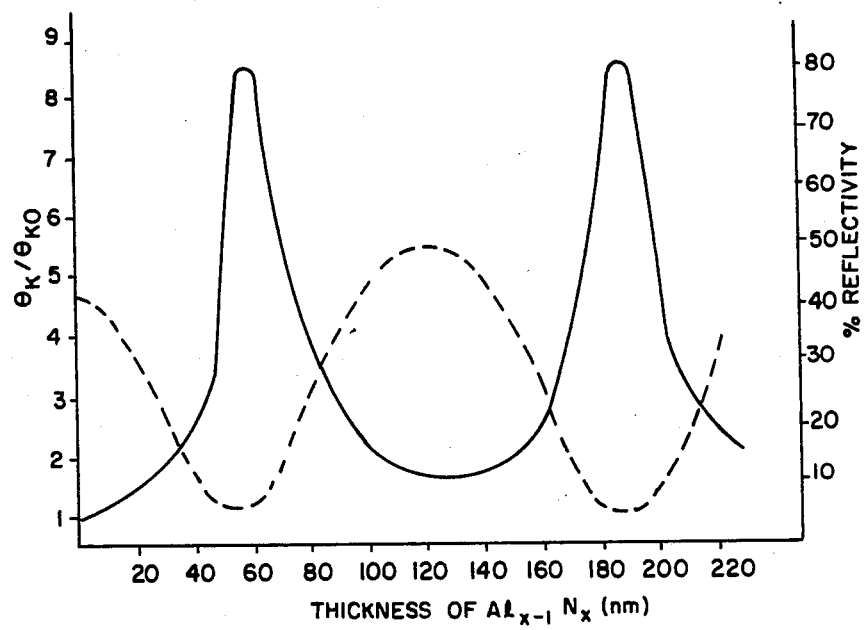
THICKNESS OF $Al_{x-1}N_x$ (nm)
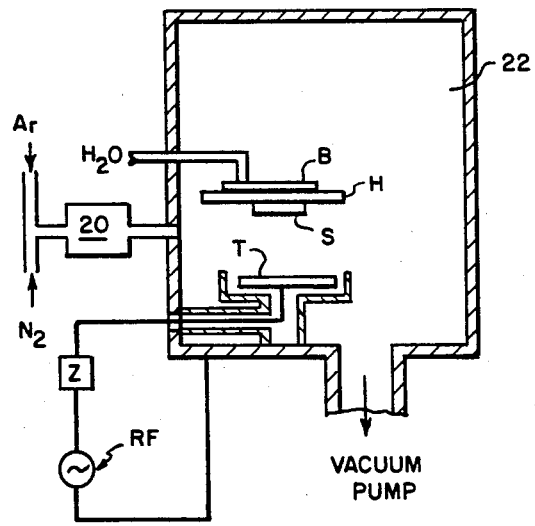
FIG. 5

MAGNETO-OPTIC RECORDING ELEMENT WITH AMORPHOUS ALUMINUM-NITROGEN ALLOY LAYER

BACKGROUND OF THE INVENTION

This invention relates to the field of magneto-optic (MO) recording and, more particularly, to improvements in magneto-optic recording elements.

As used herein, "magneto-optic recording element" refers to a multilayer structure used in the magneto-optic write/read process for selectively modifying the characteristic of an incident polarized light beam in accordance with a magnetization pattern formed in a magneto-optic recording layer which forms part of such structure. Typically, such recording element includes a substrate, a magneto-optic recording layer (e.g. amorphous alloys of rare earth and transition metals) and one or more corrosion-preventing, anti-reflection layers of a dielectric or semi-conductive material. A so-called "bi-layer" recording element comprises a magneto-optic layer having a single anti-reflection layer disposed on one surface thereof, the opposite surface of the magneto-optic layer being contiguous with the supporting substrate (which is not counted in determining the number of layers). A "tri-layer" structure would include a second protective layer disposed between the substrate and the MO layer.

A primary function of the anti-reflection protective layer in an MO recording element is to enhance the magneto-optic rotation angle $\Theta_K$ caused by the well-known Kerr effect (in reflective systems) and Faraday effect (in transmission systems). As is well known, some of the more desirable MO materials exhibit a $\Theta_K$ of well less than 0.5°, and, without enhancement, the signal-to-noise ratio of the read-out signal, is marginal, at best. Another equally important function of the antireflection layer is to prevent corrosion of the contiguous MO layer. It is well known that some of the most promising MO layers (e.g. the aforementioned rare earth-transition metal (RE-TM) alloys) are environmentally unstable. That is, they exihibit little resistance to corrosion and oxidation which, of course, dramatically alters their magneto-optic properties.

In a 1984 article published in the Japanese Journal of Applied Electronics, Vol. 8, No. 2, pp. 93-96, entitled "Study on High Reliability of a Magneto-optic Medium with a Multilayer Structure," K. Ohta et al disclose a tri-layer recording element in which a rare earth-transition metal (RE-TM) thin film is sandwiched between a pair of corrosion-preventing layers made of crystalline aluminum nitride (AlN). These layers are supported by a glass substrate, and the exposed AlN layer is overcoated with a reflective layer (e.g. copper). As a result of this multilayer arrangement, the magneto-optic rotation angle, $\Theta_K$, increased to 1.2 degrees, and the coercive force of the MO layer was relatively stable over time. While this enhanced value of $\Theta_K$ produces a relatively high figure of merit, $\Theta_K R$, (where R is the power reflectivity of the recording element), the manufacture of such an element is relatively time-consuming and, hence, costly. Moreover, the environmental stability of such elements is still far less than desirable.

SUMMARY OF THE INVENTION

In view of the foregoing, an object of this invention is to provide a simple and low cost MO recording element whose figure of merit, $\Theta_K \sqrt{R}$, is comparable to those of the more complicated trilayer structure.

Another object of this invention is to provide a magneto-optic recording element which exhibits greater corrosion resistance than prior art elements.

Another object of the invention is to provide a method for making the MO recording elements of the invention.

It has been discovered that by making a new amorphous film based on Al and N, it is possible to achieve $\Theta_K$ enhancement and corrosion resistance of the conventional MO media. These improvements in the property of the MO element are markedly greater than previously achieved by crystalline aluminum nitride (AlN) thin film overlayer. Thus, the magneto-optic recording element of the invention basically comprises a layer of magneto-optic material having a protective, antireflection overlayer of an amorphous aluminum-nitrogen alloy. The amorphous layer is preferably formed by a reactive sputtering process in which deposition rate, the nitrogen-to-inert gas ratio, the substrate temperature, the sputter power, the nitrogen flow rate, and the total pressure are precisely controlled.

The invention will be better understood from the ensuing detailed description of preferred embodiments, reference being made to the accompanying drawings wherein like reference characters denote like parts.

BRIEF DESCRIPTION OF THE DRAWINGS

FIG. 4 illustrates the manner in which recording element reflectivity and magneto-optic rotation angle vary with thickness of the antireflective coating;

FIG. 5 schematically illustrates a reactive sputtering apparatus of the type used for producing the magneto-optic recording element of the invention;

DETAILED DESCRIPTION OF PREFERRED EMBODIMENTS

Figure 1A:
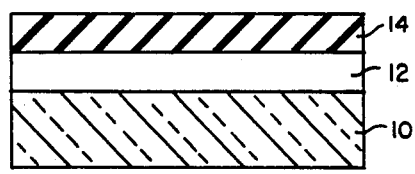
FIGS. 1A and 1B are cross-sectional views of preferred magneto-optic recording elements of the invention.

Referring now to the drawings, FIG. 1A is a cross-sectional view of a bi-layer magneto-optic recording element embodying the present invention. Such recording comprises a substrate 10 which may, if desired, be a transparent material made of, for example, glass, polycarbonate, acetate or acrylic resin. Disposed atop substrate 10 is a magneto-optic thin-film layer 12 which may comprise any material which imparts a Kerr or Faraday effect to incident polarized light. Preferably, however, recording layer 12 comprises a ternary alloy including a rare earth and transition metal. A particularly preferred MO media is a terbium-iron-cobalt (TbFeCo). Disposed atop recording layer 12 is an antireflection, corrosion-preventing layer 14 of aluminum-nitrogen alloy ($Al_{1-x}N_x$) thin film.

Figure 6:
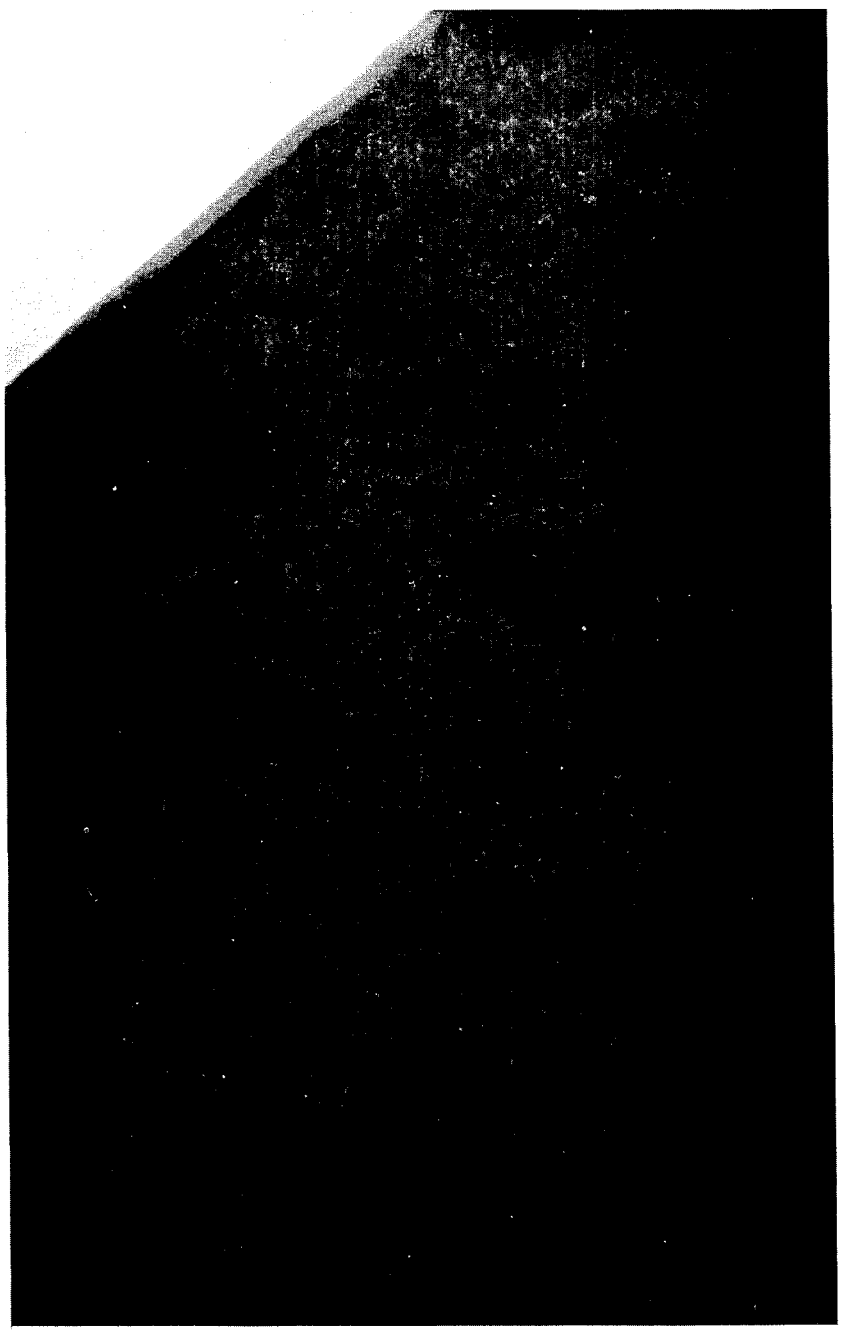
FIG. 6 is a transmission electron micrograph (TEM) at 250,000 × of an amorphous aluminum-nitrogen alloy thin film made in accordance with the method of the invention.
Figure 7:
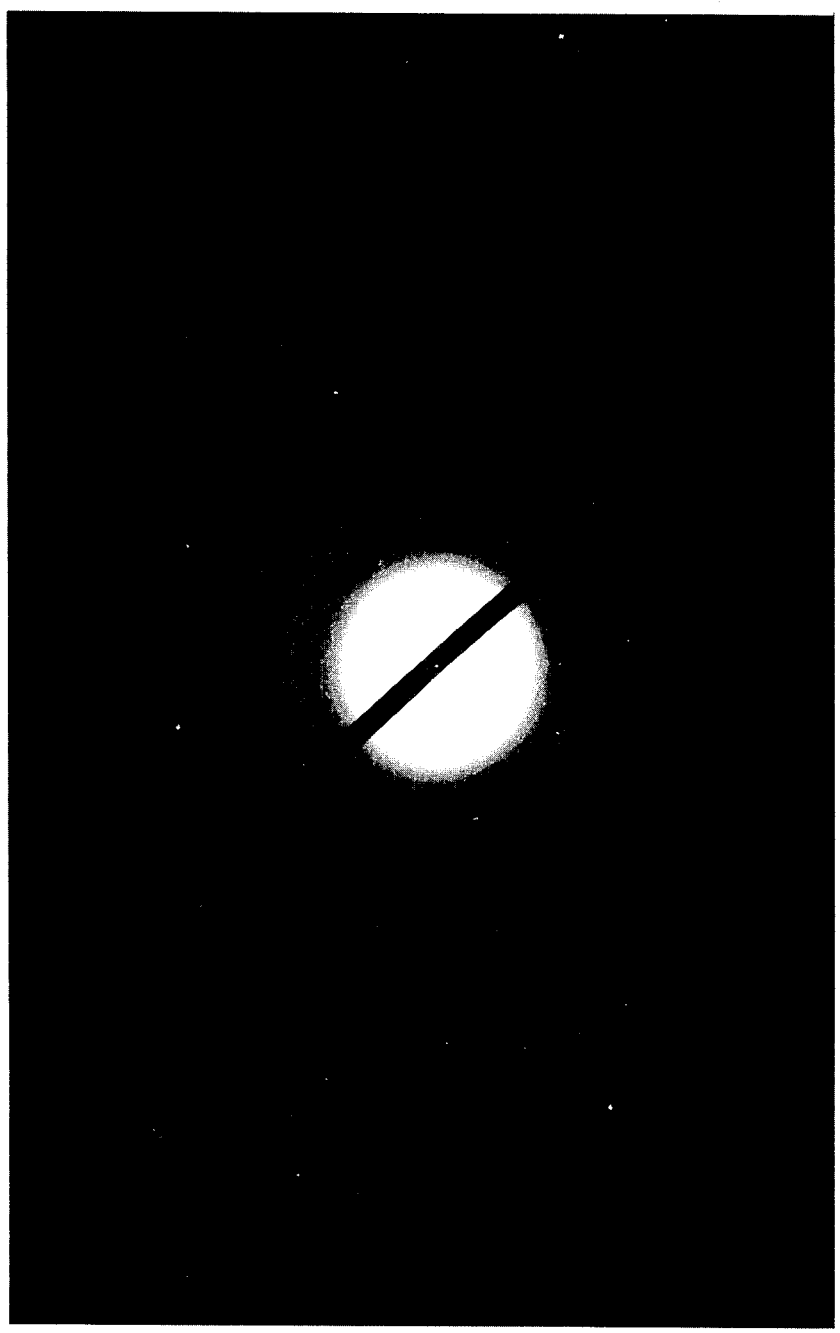
FIG. 7 is an electron beam diffraction pattern of a selected portion of the thin film shown in FIG. 6.

According to the present invention, the $Al_{1-x}N_x$ layer of the FIG. 1A recording element is amorphous in character, that is, it is substantially free of any crystalline structure as evident in the micrograph and electron diffraction pattern of FIGS. 6 and 7. As such, there are no grain boundaries which would act as fast diffusion paths through which ambient gases can reach and react with the MO layer. Also, the absence of grain boundaries, has the effect of eliminating grain boundary noise which tends to reduce the performance (i.e., signal/-noise ratio) of the recording element.

The compositional formula or stoichiometry of this amorphous layer can be represented by the formula $Al_{1-x}N_x$, where x is between about 0.30 and 0.45. It should be noted that this material is distinct from stoichiometric crystalline compound, AlN, with respect to its optical properties. For example, the refractive index of a thin (e.g. 60 nanometer) $Al_{1-x}N_x$ film on a Si substrate at 633 nm. wavelength is about 1.85, compared to about 2.05 for crystalline AlN. When using the recording element of FIG. 1A in a front surface write/read mode, the index 1.85 is a better match to typical MO media (n≈3.2) than the index (n=2.05) of crystalline AlN for antireflection effects. Assuming a front surface write/read mode in which incident medium is air, an optimum match (i.e. to achieve the maximum antireflection condition) is achieved when the refractive index of the overlayer is equal to the square root of the refractive index of the MO layer.

Figure 2:
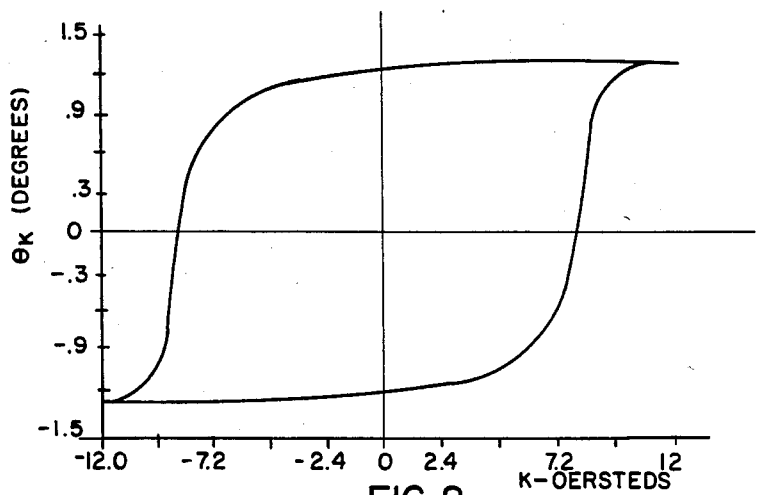
FIGS. 2 and 3 are Kerr hysteresis loops of a magneto-optic recording element (FIG. 1A) with and without the antireflection layer of the invention, respectively.
Figure 3:
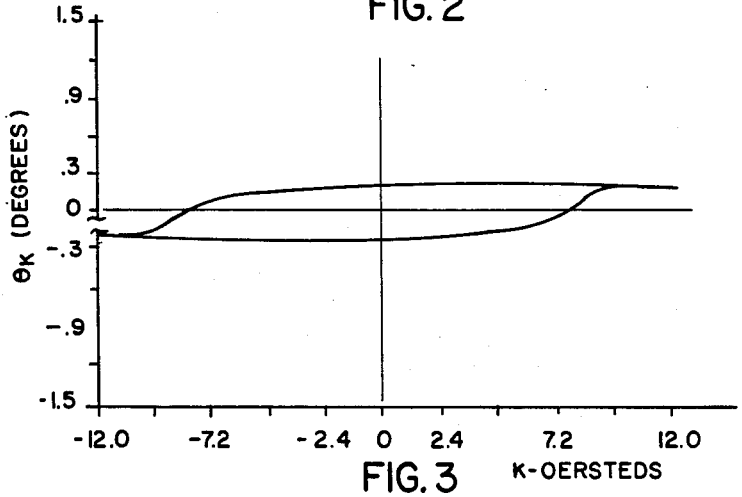

Referring to FIGS. 2 and 3, the Kerr hysteresis loop of an amorphous $Al_{1-x}N_x$ coated TbFeCo bi-layer recording element is shown in FIG. 2, while that of an uncoated TbFeCo is shown in FIG. 3. Note, with no applied field, $2\Theta_K$ is approximately 2.33 degrees with the amorphous $Al_{1-x}N_x$ coated recording element, whereas $2\Theta_K$ for the uncoated element is only about 0.28 degrees. This overall enhancement by a factor of more than eight is believed to be the highest Kerr rotation enhancement observed so far in a simple bi-layer recording element. It is quite comparable to that achieved in more complicated multilayer structures, such as reported in the aforementioned article by Ohta et al. The manner in which the reflectivity and Kerr enhancement vary with thickness of the $Al_{1-x}N_x$ layer is shown in FIG. 4. Here, the Kerr enhancement factor is represented by $\Theta_K/\Theta_{KO}$, where $\Theta_{KO}$ and $\Theta_K$ are Kerr rotation angles of an uncoated and coated recording element respectively. Preferably, the thickness of the $Al_{1-x}N_x$ overlayer is optimized by maximizing the aforementioned figure of merit, $\Theta_K\sqrt{R}$.

Amorphous aluminum nitride thin films can be prepared, for example, in a RF planar magnetron system by reactively sputtering an aluminum target (e.g. 99.9995% purity) in an argon-nitrogen atmosphere. The general configuration for RF magnetron sputtering is shown in FIG. 5. As shown, argon and nitrogen gases are pre-mixed in mixing chamber 20 before admission into a vacuum chamber 22. The substrate S, which is to receive the $Al_{1-x}N_x$ film, is positioned on a substrate holder H which, in turn, is positioned in thermal contact with a water-cooled copper block B. The aluminum target T is spaced from substrate S by about 5 cm. The target is supported by a conventional planar magnetron (e.g. disclosed in U.S. Pat. No. 4,324,631) and is operatively coupled to the negative terminal of a two kilowatt A.C. power source RF. The power applied to the target is controlled by a variable impedance Z. The vacuum chamber is pumped below $1 \times 10^{-7}$ Torr before backfilling with ultrahigh purity argon and nitrogen. In order to minimize contamination in the deposited film, it is preferable to sputter clean the target in a conventional manner, while a shutter S' protects the substrate S from deposition. Such cleaning is carried out in two steps, first sputtering in a pure argon atmosphere for about 15 minutes, and then sputtering for 30 minutes in the desired gas mixture.

It has been found that the properties of the deposited $Al_{1-x}N_x$ films depend upon certain parameters of the RF sputtering system. One important parameter is the deposition rate which, of course, depends on the RF input power, target to substrate distance, substrate temperature, total sputtering pressure and the partial pressure of nitrogen, etc. In addition to the deposition rate, the following other parameters need be controlled to produce amorphous films: (a) ratio of nitrogen to argon, (b) substrate temperature, (c) the sputtering power, (d) the reactive gas ($N_2$) flow rate, and (e) the total pressure. The following conditions have been found to give rise to amorphous $Al_{1-x}N_x$ films:

$N_2$:Ar Ratio-30–50%
Substrate Temperature-<80°C.
Deposition Rate->15 nanometer/minute
Sputter Power-600–1000 Watts
Nitrogen Flow Rate-3–6 sccm
Total Sputtering Pressure-1–15 mTorr.

When the $N_2$:Ar ratio was less than 20%, the film consists substantially of polycrystalline aluminum, and when the $N_2$:Ar ratio exceeded 50%, the films obtained are of microcrystalline aluminum-nitride. The desired stoichiometry mentioned above (i.e., amorphous $Al_{1-x}N_x$ films where x is between about 0.30 to 0.45) is achieved when the $N_2$:Ar ratio is between about 30% and 50%, and the other parameters are met.

During RF sputtering, the following general conditions were met:
Sputtering Power-300–2000 Watts
Sputtering gas pressure-1–30 mTorr
Background pressure-$1 \times 10^{-7}$ Torr
$N_2$ flow rate-3–6 sccm
Target to substrate distance-5 cm.

Figure 1B:
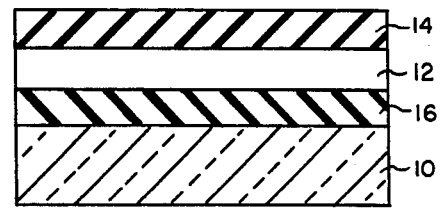

As indicated above, amorphous $Al_{1-x}N_x$ films can be advantageously used in more complex recording elements, such as the tri-layer structure shown in FIG. 1B. When positioned on opposite sides of the magneto-optic layer, the latter is protected from corrosion from both sides. The amorphous $Al_{1-x}N_x$ intermediate layer 16 prevents any absorbed water or impurities in the substrate 10 from migrating to the MO layer 12 causing the formation of metal hydroxides or oxides.

Since Al is very reactive to oxygen as it is possible that trace amounts of oxygen present in the sputtering chamber during film deposition may find its way into the $Al_{1-x}N_x$ film. Such modifications, if it occurs in these films, whether or not beneficial, is intended to be covered by this invention.

While the invention has been disclosed with particular reference to a preferred embodiment, it will be apparent to those skilled in the art that modifications may be made without departing from the spirit and scope of the invention, as defined by the following claims.

I claim:

1. A magneto-optic recording element of the type comprising a magneto-optic layer disposd on a substrate, said layer having a contiguous overlayer of an aluminum-nitrogen alloy, characterized in that said alloy overlayer is amorphous, and in that the stoichiometry of the aluminum-nitrogen alloy is $Al_{1-x}N_x$ where x is between about 0.30 to 0.45.

2. The recording element of claim 1 wherein said magneto-optic layer comprises an alloy of rare earth and transition metals.

3. The recording element of claim 1 wherein said magneto-optic layer comprises an amorphous Tb-Fe-Co alloy.

4. A magneto-optic recording element comprising a substrate, a first amorphous layer of an aluminum-nitrogen alloy disposed on said substrate, a magneto-optic layer disposed on said first amorphous layer, and a second amorphous layer of an aluminum-nitrogen alloy disposed on said magneto-optic layer, said first and second layers, having a stoichiometry, $Al_{1-x}N_x$, where x is between about 0.30 and 0.45.

5. The recording element of claim 4 wherein said magneto-optic layer comprises an alloy of rare earth and transition metals.

6. The recording element of claim 4 wherein said magneto-optic layer comprises an amorphous alloy of terbium, iron and cobalt.

* * * * *